United States Patent Office 3,523,467
Patented Aug. 11, 1970

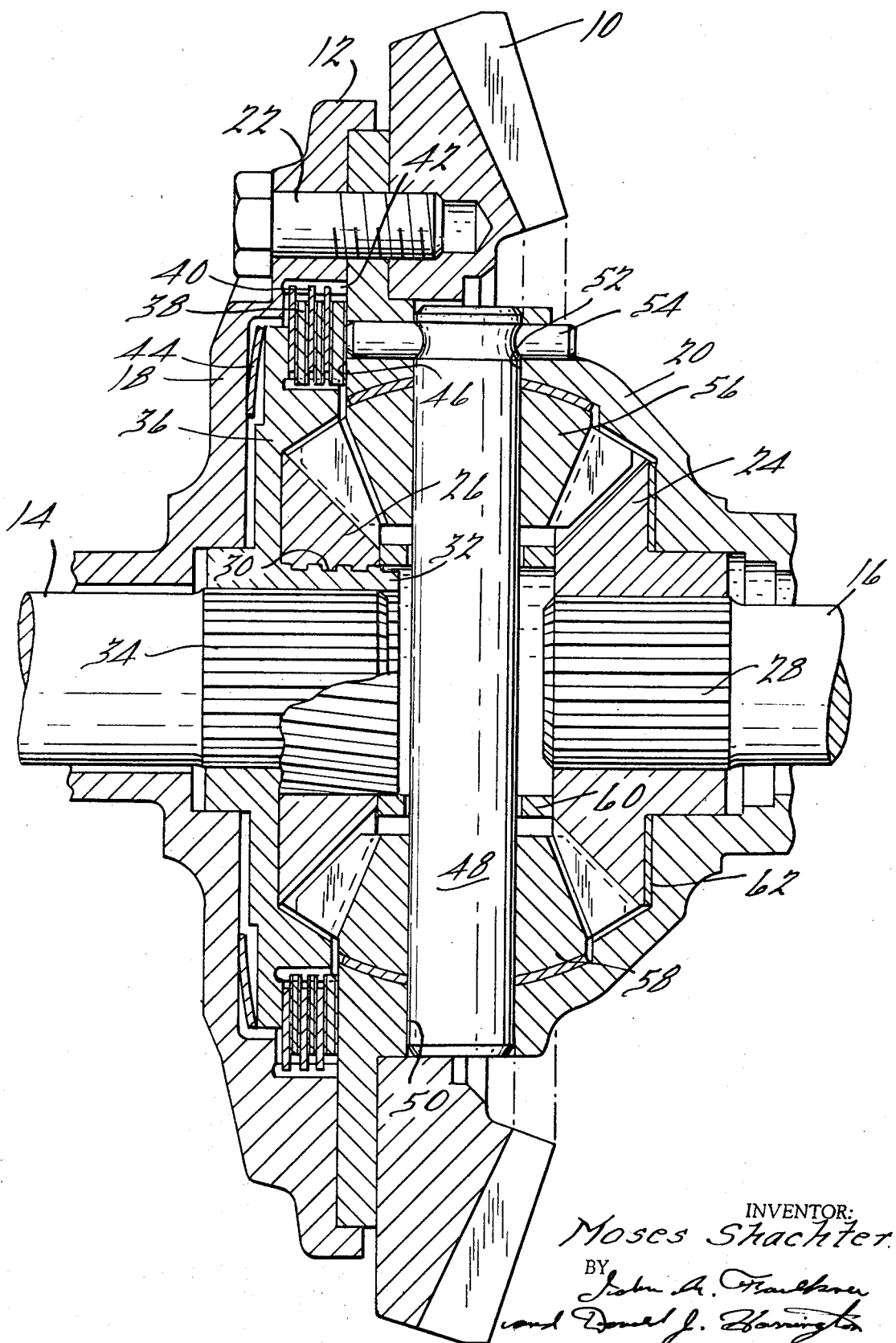

3,523,467
AUTOMATIC LIMITED SLIP DIFFERENTIAL
Moses Shachter, Oak Park, Mich., assignor to Ford Motor Company, Dearborn, Mich., a corporation of Delaware
Filed June 3, 1968, Ser. No. 733,877
Int. Cl. F16h 1/44
U.S. Cl. 74—711                                                          4 Claims

ABSTRACT OF THE DISCLOSURE

A geared differential having a pair of side gears, a driving carrier assembly including pinions engaged with each side gear, each side gear being connected to a separate driving axle, and friction clutch means for connecting one axle shaft to the housing for the carrier assembly wherein provision is made for normally engaging the clutch when the driving torque is reduced thereby disengaging the clutch in response to an increase in the torque applied to one side gear to effect normal differential action during operation of the mechanism under torque and to provide a locking torque bias when one axle shaft loses tractive effort.

BRIEF DESCRIPTION OF THE INVENTION

My invention comprises a geared differential mechanism for use in an automotive vehicle driveline. It is adapted to deliver driving torque from the vehicle driveshaft to each of two axle shafts for the vehicle traction wheels.

The differential includes a differential carrier that supports a ring gear which in turn is driven by a driving pinion powered by the driveshaft. Differential side gears are located in the housing, one side gear being connected to the inboard end of one axle shaft and the other side gear being connected to the inboard end of the other axle shaft. Two differential pinions are journalled rotatably in the housing in meshing engagement with the side gears.

A friction disc clutch mechanism located in the housing is adapted to connect drivably one axle shaft to the housing. The clutch is engaged under the influence of a prestressed Belleville spring, thus normally tending to lock the differential gear elements together for rotation in unison. This establishes a minimum torque bias in the differential regardless of whether one axle shaft loses tractive effort.

One of the side gears is connected to the clutch structure with a helical spline connection so that the torque delivered to that side gear develops an axial clutch disengaging force that opposes the force of the Belleville spring. This axial force is available whenever torque is delivered through the gearing, thus tending normally to disengage the friction clutch.

The differential, when it is operating under torque, operates as a conventional design with no positive driving characteristic. If one axle shaft should lose tractive effort, however, the axial forces developed by the helical spline connection are insufficient to overcome the spring force. The friction clutch then tends to become applied thereby introducing a minimum torque bias that assures torque delivery to at least one axle shaft regardless of whether tractive effort on the other axle shaft is lost.

I am aware of prior art driveline mechanisms having a positive drive characteristic of this kind. These include a friction clutch in the differential that is applied under the influence of spring pressure to cause one side gear to become locked to the differential carrier housing. A torque bias is available, but normal differential action cannot occur unless the friction clutch is allowed to slip. This introduces a constant wear on the clutch members during normal operation, and the amount of the torque bias available when locking action is desired is undesirably low.

Other differential mechanism having a positive torque bias include a friction disc clutch that is applied under the influence of spring pressure which is relieved in response to the axial gear tooth forces developed by the meshing engagement of the pinions with the side gears. This causes slight axial displacement of the side gears, which results in mismatching of the pitch circles of the pinions and the side gears, thereby producing gear noise as one side gear undergoes differential motion with respect to the other. This problem is overcome with my improved construction since the side gears and the pinions remain in fixed, precise, conjugate relationship.

BRIEF DESCRIPTION OF THE FIGURES OF THE DRAWING

The single view of the drawing shows in longitudinal cross-sectional form an assembly view of a differential gearing mechanism embodying the improved clutch structure of my invention.

PARTICULAR DESCRIPTION OF THE INVENTION

In FIG. 1, a numeral 10 designates a bevel ring gear, which is carried by a differential carrier housing 12. The ring gear 10 is adapted to mesh with a driving pinion, which in turn is powered by the driveshaft of an automotive vehicle driveline. The ring gear 10 and the housing 12 are journalled for rotation about the axis of concentric axle shafts 14 and 16.

The housing 12 is formed in two parts, which are identified separately by reference characters 18 and 20. The parts are joined together by bolts 22, which bolts also secure the ring gear 10 to the housing 12. The parts 18 and 20 are flanged to facilitate a bolted connection on the periphery of the housing 12.

Journalled within the housing 12 is a pair of side gears 24 and 26. Gear 24 is splined internally to receive the splined end 28 of the shaft 16. Side gear 26 is formed with an internal helical spline which registers with external helical spline teeth 30 on sleeve 32. The interior of the sleeve 32 is formed with conventional spline to receive the inboard splined end 34 of the axle shaft 14.

Sleeve 32 forms a part of a clutch pressure plate 36. Plate 36 is formed with external splines which carry internally splined clutch disc 38. These are situated in interdigital relationship with respect to friction discs 40, which are externally splined to the internally splined cavity 42 in the housing part 18. A Belleville spring washer 44 is disposed within the housing part 18 directly adjacent pressure plate 36. When it is positioned as shown in FIG. 1, spring 44 is deflected thereby exerting normally a clutch engaging force on a pressure plate 36. The plate applies an axial clutch applying force to the assembly of discs 38 and 40. The reaction for this force is taken by shoulder 46 formed on housing part 18.

The pinion shaft 48 is carried by the housing part 20, the latter being formed by aligned openings 50 and 52 which receive the shaft 48. Shaft 48 is held axially fast by retainer pin 54 which engages a retainer groove in the shaft 48. The pin 54 is received within a transverse opening in the housing part 20, which intersects the opening 52.

Two pinions 56 and 58 are supported rotatably on the shaft 48. Pinion 56 continuously meshes with side gears 24 and 26, and pinion 58 meshes with the same side gears at a location 180° out of position with respect to the pinion 56. A spacer in the form of a tube 60 is situated between the side gears 24 and 26. The axis of spacer 60 coincides with the common axis for the shafts 14 and 16. Spacer 60 is provided with aligned openings through which the pinion shaft 48 extends.

During torque delivery, the helical spline connection between the side gear 26 and the sleep 32 establishes a thrust force on the clutch pressure plate 36 which tends to oppose the force of spring 44. The magnitude of this force is sufficient to cause disengagement of the clutch discs during normal forward drive operation under torque. At that time, gear 26 maintains a constant engagement with its pinions and is not subject to shifting movement. Displacement of the gear 26 in a right-hand direction upon application of torque to the ring gear 10, does not occur because of the action of the spacer 60.

Thrust forces in a right-hand direction acting on the gear 26 are transferred through the spacer 60 and through the side gear 24 to the housing 12 and the bushing 62. At this time the differential mechanism acts as a non-locking, conventional differential wherein torque applied to the ring gear is transferred equally to each of the side gears 24 and 26 and hence to each of the axle shafts 16 and 14.

If one of the axle shafts should lose traction, the axial force developed by the helical spline is decreased accordingly. When its value becomes less than the axial force of the spring 44, the clutch becomes applied, thereby establishing a torque bias that permits minimum torque distribution to the traction wheel that has the higher surface coefficient of friction.

If the vehicle is driven backward, the torque appiled to the ring gear 10 is reversed and the direction of the axial forces on the helical splines is reversed. The pressure plate 36 and the gear 26 then become locked together.

Wear of the friction disc during normal driving under torque is reduced because the force of the helical spline tends to overcome the force of the spring 44. Thus, normal turning maneuvers will produce minimum wear of the friction discs as the vehicle is driven in a forward driving direction under torque.

The axial forces developed by the helical spline are sufficient to cause disengagement of the clutches regardless of the presence of a relatively high rate spring. It thus is possible to use only a single clutch pack rather than a double clutch pack, as in certain prior art arrangements, to establish a positive driving characteristic. It does not require gear tooth thrust forces as it is applied and released, but rather the axial forces developed by the helical spline effect clutch disc engagement.

Having thus described a preferred form of my invention, what I claim and desire to secure by U.S. Letters Patent is:

1. A differential gear mechanism comprising a differential carrier housing, a ring gear carried by said housing, a pair of power output axle shafts received within said housing, a pair of side gears in said housing, each side gear being connected to a separate one of said axle shafts, differential pinions journalled in said housing in meshing engagement with said gears, friction clutch means including a clutch element and friction elements, one friction element being connected to said clutch element and another friction element being connected to said housing and registering with the said one friction element, said clutch element including a sleeve hub, external helical spline teeth on said hub, internal helical spline teeth on one side gear registering with said external spline teeth whereby an axial force is applied to said clutch element to urge said clutch element away from the axis of said pinions toward an adjacent part of said housing as torque is applied to said one side gear, and spring means situated between said adjacent housing part and said clutch element whereby said clutch element is urged in a direction opposite to the direction of the force developed by said helical splin thereby normally tending to urge said friction elements into clutching engagement, the force reaction of said axial force being effective upon said one side gear and opposing the gear tooth separating forces at the meshing engagement between said one side gear and said pinions, and spacer means for transmitting said force reaction to said housing whereby said pinions and said side gears maintain precise, conjugate registry as said friction elements are engaged and disengaged in response to changing torque applied to said one side gear.

2. The combination as set forth in claim 1 wherein said spring means comprises a Belleville washer situated between one wall of said housing and said clutch element with one margin of said spring engaging said housing and the other margin thereof engaging said clutch element thereby normally urging said friction element into clutching engagement to establish a positive torque bias as torque is delivered to said ring gear and the tractive effort on one axle shaft becomes reduced, said torque bias permitting torque distribution from said ring gear to the other axle shaft.

3. The combination as set forth in claim 2 wherein said spacer means comprises a rigid spacer element situated between said side gears whereby the reaction forces developed by said helical spline as clutch disenaging forces are transmitted to said clutch element are in turn transmitted therethrough and through the other side gear to said housing thereby maintaining a fixed conjugate relationship between said side gears and said pinions.

4. The combination as set forth in claim 1 wherein said spacer means comprises a rigid spacer element situated between said side gears whereby the reaction forces developed by said helical spline as clutch disengaging forces are transmitted to said clutch element are in turn transmitted therethrough and through the other side gear to said housing thereby maintaining a fixed conjugate relationship between said side gears and said pinions.

References Cited

UNITED STATES PATENTS

| | | | |
|---|---|---|---|
| 1,361,895 | 12/1920 | Nogrady | 74—711 |
| 1,750,981 | 3/1930 | Wildhaber | 74—711 |
| 2,234,591 | 3/1941 | Fitzner | 74—711 |
| 2,431,272 | 11/1947 | Mynssen et al. | 74—711 |
| 2,923,174 | 2/1960 | Gleasman | 74—711 |
| 3,264,901 | 8/1966 | Ferbitz et al. | 74—711 |
| 3,364,791 | 1/1968 | Truckle | 74—711 |

DONLEY J. STOCKING, Primary Examiner

T. C. PERRY, Assistant Examiner